(12) United States Patent
Shull et al.

(10) Patent No.: US 10,604,648 B2
(45) Date of Patent: Mar. 31, 2020

(54) PH CONTROLLED ELECTROCHEMICAL DEPOSITION OF POLYELECTROLYTE COMPLEX FILMS

(71) Applicant: Northwestern University, Evanston, IL (US)

(72) Inventors: Kenneth R. Shull, Evanston, IL (US); Kazi Sadman, Evanston, IL (US); Qifeng Wang, Evanston, IL (US)

(73) Assignee: NORTHWESTERN UNIVERSITY, Evanston, IL (US)

( * ) Notice: Subject to any disclaimer, the term of this patent is extended or adjusted under 35 U.S.C. 154(b) by 138 days.

(21) Appl. No.: 15/901,024

(22) Filed: Feb. 21, 2018

(65) Prior Publication Data

US 2018/0237632 A1    Aug. 23, 2018

Related U.S. Application Data

(60) Provisional application No. 62/461,948, filed on Feb. 22, 2017.

(51) Int. Cl.
| | | |
|---|---|---|
| *C08L 57/06* | (2006.01) | |
| *H01M 8/10* | (2016.01) | |
| *C08L 41/00* | (2006.01) | |
| *H01M 4/90* | (2006.01) | |
| *C09D 133/02* | (2006.01) | |

(Continued)

(52) U.S. Cl.
CPC ............. *C08L 57/06* (2013.01); *C08L 41/00* (2013.01); *C09D 133/02* (2013.01); *C09D 139/00* (2013.01); *H01M 4/9016* (2013.01); *H01M 8/103* (2013.01); *H01M 8/1032* (2013.01); *C08L 2203/16* (2013.01); *C08L 2203/20* (2013.01); *Y02E 60/521* (2013.01)

(58) Field of Classification Search
CPC ...... C08L 57/06; C08L 41/00; C08L 2203/16; C08L 2203/20; H01M 8/1032; H01M 8/103; H01M 4/9016
USPC .......................................................... 521/27
See application file for complete search history.

(56) References Cited

U.S. PATENT DOCUMENTS

2012/0148522 A1*   6/2012   Schlenoff ................ A61L 15/42
                                                                                424/78.35

OTHER PUBLICATIONS

Sadman et al "pH-Controlled Electrochemical Deposition of Polyelectrolyte Complex Film", ACS Publications, DOI: 10.1021/acs.lan langmuir.6b04491, Langmuir 2017, 33, 1834-1844. (Year: 2017).*

(Continued)

*Primary Examiner* — Michael Bernshteyn
(74) *Attorney, Agent, or Firm* — Bell & Manning, LLC

(57) ABSTRACT

Methods for forming a polyelectrolyte complex (PEC) film are provided. In embodiments, the method comprises applying a potential between a working electrode and a counter electrode, the electrodes in contact with an aqueous polyelectrolyte solution characterized by a bulk pH. The aqueous polyelectrolyte solution comprises a pH sensitive PEC pair comprising an unmodified anionic polymer and a cationic species, an electrochemical pH agent other than water, and a salt. The applied potential induces an electrochemical reaction of the electrochemical pH agent to generate OH⁻ or H⁺ at the working electrode without inducing water electrolysis in the aqueous polyelectrolyte solution, thereby forming a PEC film from the unmodified anionic polymer and the cationic species on a surface of the working electrode.

20 Claims, 11 Drawing Sheets

(51) Int. Cl.
    C09D 139/00    (2006.01)
    H01M 8/1032    (2016.01)
    H01M 8/103     (2016.01)

(56)                References Cited

OTHER PUBLICATIONS

Garnier et al., Surface confined self-assembly of polyampholytes generated from charge-shifting polymers, Chem. Commun., 51, Aug. 5, 2015, pp. 14092-14095.
Dochter et al., Film Self-Assembly of Oppositely Charged Macromolecules Triggered by Electrochemistry through a Morphogenic Approach, Langmuir, 31, Aug. 31, 2015, pp. 10208-10214.
Rydzek et al., Electrochemical nanoarchitectonics and layer-by-layer assembly: From basics to future, Nano Today, 10, Mar. 29, 2015, pp. 138-167.
Richardson et al., Innovation in Layer-by-Layer Assembly, Chem. Rev., 116, Nov. 23, 2016, pp. 14828-14867.
Pang et al., Electrophoretic deposition of composite hydroxyapatite-chitosan coatings, Materials Characterization 58, 2007, pp. 339-348.
Liu et al., Universal dispersing agent for electrophoretic deposition of inorganic materials with improved adsorption, triggered by chelating monomers, Journal of Colloid and Interface Science 462, Sep. 25, 2015, pp. 1-8.
K. Sadman, High Frequency Rheology of Polyelectrolyte Complex Films, Presentation, Feb. 24, 2016.
Sadman et al., pH-Controlled Electrochemical Deposition of Polyelectrolyte Complex Films, Langmuir, Feb. 1, 2017.

* cited by examiner

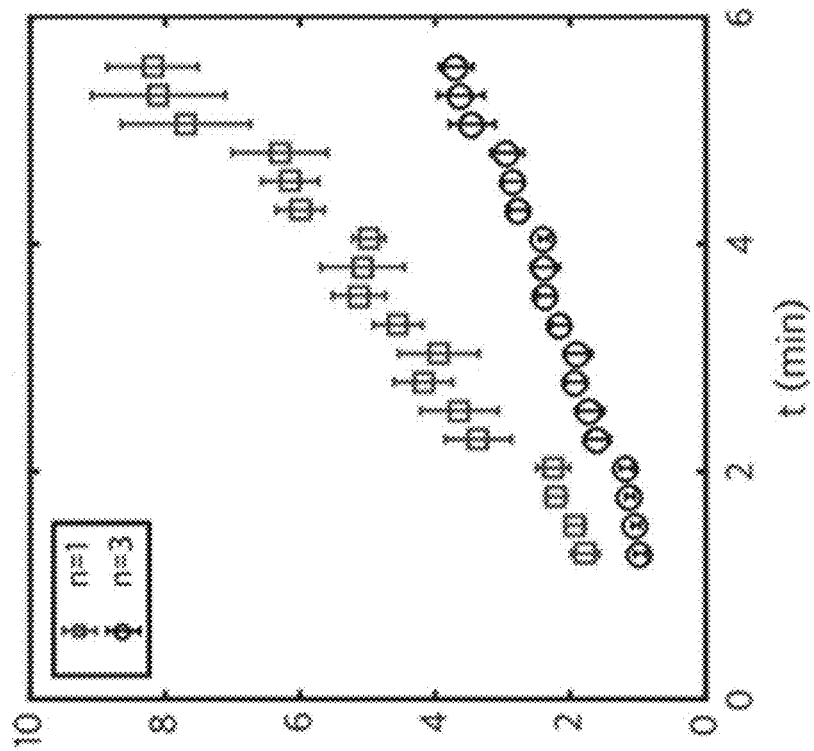
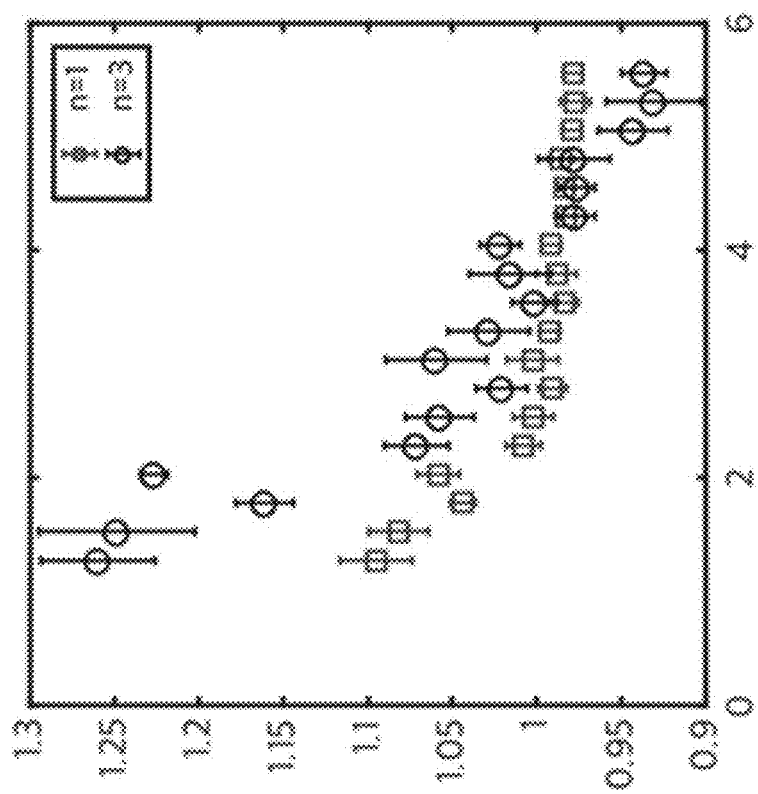
FIG. 4A
FIG. 4B

PH CONTROLLED ELECTROCHEMICAL DEPOSITION OF POLYELECTROLYTE COMPLEX FILMS

CROSS REFERENCE TO RELATED APPLICATIONS

The present application claims priority to U.S. provisional patent application No. 62/461,948 that was filed Feb. 22, 2017, the entire contents of which are hereby incorporated by reference.

REFERENCE TO GOVERNMENT RIGHTS

This invention was made with government support under DMR1410968 awarded by the National Science Foundation. The government has certain rights in the invention.

BACKGROUND

Polyelectrolyte complex (PEC) films made from oppositely charged polymer chains have applications as drug delivery vehicles, separation membranes, and biocompatible coatings. Conventional layer-by-layer (LbL) techniques for growing polyelectrolyte coatings are low-throughput, multistep processes that are impractically slow for building films on the order of micrometers.

SUMMARY

Methods for forming polyelectrolyte complex (PEC) films are provided as well as the resulting films.

In one aspect, methods for forming a polyelectrolyte complex (PEC) film are provided. In embodiments, the method comprises applying a potential between a working electrode and a counter electrode, the electrodes in contact with an aqueous polyelectrolyte solution characterized by a bulk pH. The aqueous polyelectrolyte solution comprises a pH sensitive PEC pair comprising an unmodified anionic polymer and a cationic species, an electrochemical pH agent other than water, and a salt. The applied potential induces an electrochemical reaction of the electrochemical pH agent to generate $OH^-$ or $H^+$ at the working electrode without inducing water electrolysis in the aqueous polyelectrolyte solution, thereby forming a PEC film from the unmodified anionic polymer and the cationic species on a surface of the working electrode.

In other embodiments, the method comprises applying a potential between a working electrode and a counter electrode, the electrodes in contact with an aqueous polyelectrolyte solution characterized by a bulk pH. The aqueous polyelectrolyte solution comprises a pH sensitive PEC pair comprising an unmodified anionic polymer and an unmodified cationic polymer, the unmodified anionic polymer and the unmodified cationic polymer being distinct compounds, an electrochemical pH agent other than water or hydroquinone, and a salt. The applied potential induces an electrochemical reaction of the electrochemical pH agent to generate $OH^-$ or $H^+$ at the working electrode without inducing water electrolysis in the aqueous polyelectrolyte solution, thereby forming a PEC film from the unmodified anionic polymer and the cationic species on a surface of the working electrode.

Other principal features and advantages of the disclosure will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings.

FIGS. 3A and 3B show the increase in the areal mass and density-shear modulus product and FIG. 3C shows the decrease in the viscoelastic phase angle. The working electrode potential was set to −0.5 V vs. Ag/AgCl. Mechanical properties were calculated using the 1:3,3 calculation and the viscosity in FIG. 3B was calculated by noting that $|\eta_3^*|=|G_3|2\pi f$ where f is the experimental frequency (15 MHz, in this case). Error bars presented are the standard errors of three experiments. The filled time point was used to calculate the error contour plots (data not shown).

FIG. 4A shows the deviation from the Sauerbrey limit of the viscoelastic film and FIG. 4B shows the decay length of the shear wave as a function of time for the deposition outlined in FIGS. 3A-3C. The quantity $\rho d/(\rho d)_{sn}$ is the ratio of the areal mass to that calculated from the experimentally measured frequency shift. Error bars presented are the standard errors of three experiments. Note that 1 $g/m^2$=1 μm for $\rho$=1 $g/cm^3$.

FIGS. 5A and 5B depict film deposition when the potential is switched on, followed by swelling and dissolution (see inset) when it is switched off. FIG. 5C shows only the deposition while the potential is on from FIG. 5A, and FIG. 5D shows the effect of the electrode potential on the deposition from FIG. 5B. The mass reported here is the Sauerbrey mass calculated at the first harmonic, which is accurate to within 10% (see FIG. 4A).

FIG. 7C shows the degree of ionization as a function of pH for PAA and PAH.

DETAILED DESCRIPTION

Figure 1:
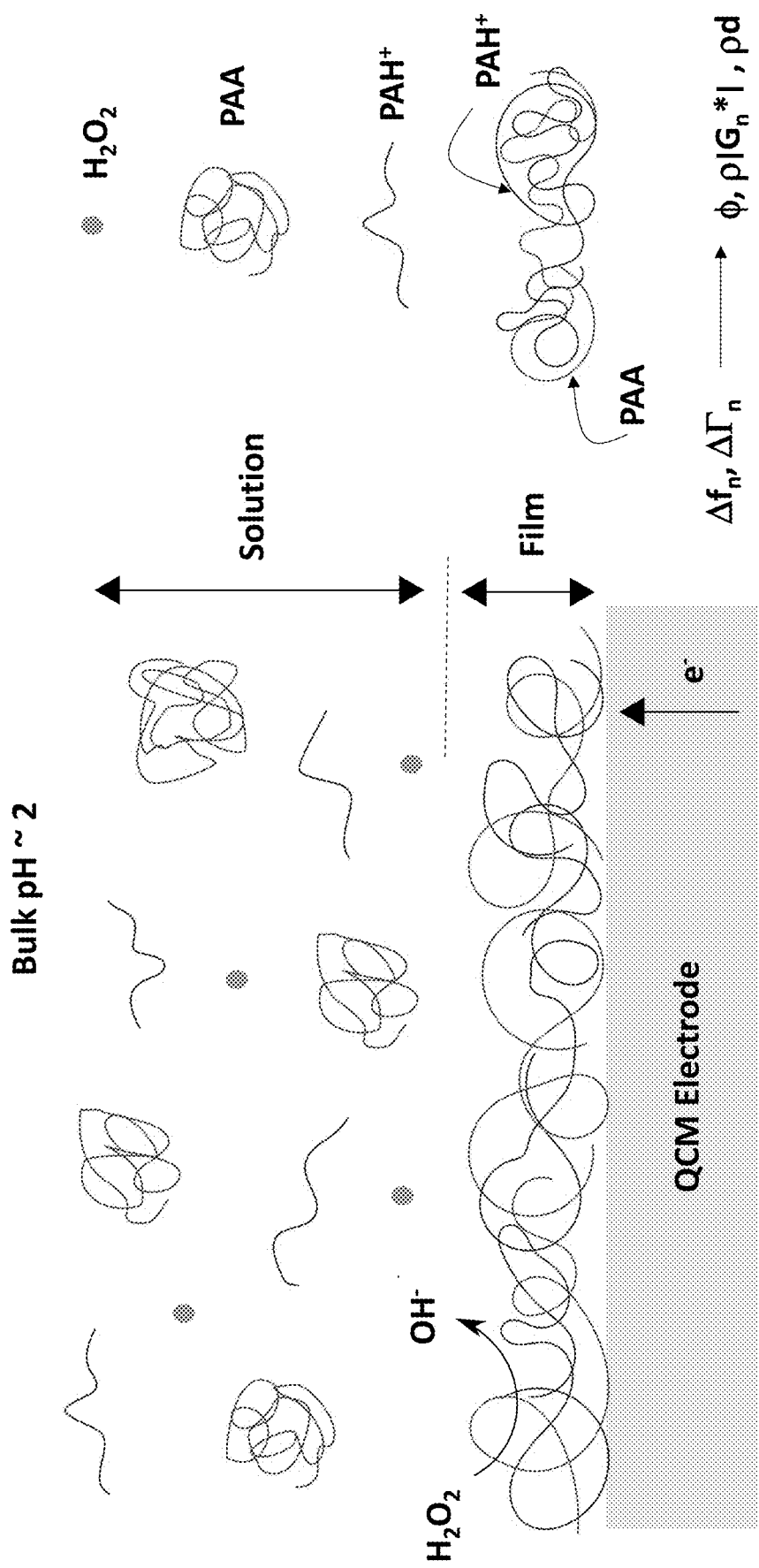
FIG. 1 illustrates how the reduction of $H_2O_2$ at the cathode induces a pH gradient triggering the self-assembly of a PEC film composed of poly(acrylic) acid (PAA) and poly(allylamine) HCl (PAH) on the QCM working electrode. The acidic bulk pH precludes premature complexation as only PAH is charged under these conditions. The deposited film results in frequency and dissipation shifts ($\Delta f_n$ and $\Delta \Gamma_n$) of the QCM that can be used to calculate the areal mass ($\rho d$), density-modulus product ($\rho|G_n^*|$) and the viscoelastic phase angle ($\phi$).

Methods for forming polyelectrolyte complex (PEC) films are provided as well as the resulting films.

In embodiments, a method for forming a polyelectrolyte complex film comprises applying a potential between a working electrode and a counter electrode, the electrodes in contact with a polyelectrolyte solution characterized by a bulk pH. The polyelectrolyte solution comprises a pH sensitive polyelectrolyte complex (PEC) pair and an electrochemical pH agent other than water. The term "pH sensitive PEC pair" is used in reference to two distinct compounds (or two portions of a single compound) which are capable of forming a polyelectrolyte complex and whose degree of complexation depends upon pH. The term does not mean the two compounds/portions are in a state of complexation, as that depends upon the pH. Both of the compounds/portions in the pair may be pH sensitive such that their degree of ionization depends upon pH, or just one of the compounds/portions in the pair may be pH sensitive.

The electrochemical pH agent is either an oxidizing agent capable of generating hydroxide ($OH^-$) upon application of the potential or a reducing agent capable of generating hydrogen ions ($H^+$) upon applied of the potential. Although water is present in the polyelectrolyte solution, the electrochemical pH agent referenced in the method is a compound other than water.

The applied potential is selected to induce an electrochemical reaction involving the electrochemical pH agent, i.e., to induce reduction of the oxidizing agent (thereby generating $OH^-$) at the working electrode or to induce oxidization of the reducing agent (thereby generating $H^+$) at the working electrode. In either case, the generation of $OH^-$ or $H^+$ results in a pH gradient extending from the surface of the working electrode into the bulk of the polyelectrolyte solution.

Due to the pH gradient, the pH of the polyelectrolyte solution at the interface with the surface of the working electrode is different from the bulk pH of the polyelectrolyte solution. The pH gradient induces simultaneous complexation of the two compounds/portions of the pH sensitive PEC pair at and/or near the surface of the working electrode to form a PEC film on the surface of the working electrode. By "simultaneous complexation" it is meant that the complexation of the PEC pair and the formation of the film happen at about the same time. The term is distinguished from sequential complexation in which a first sublayer of, e.g., a polycation, is formed on a substrate, followed by formation of a second sublayer of e.g., a polyanion, on the polycation film to form a PEC film.

As noted above, the polyelectrolyte solution comprises the two compounds/portions of a pH sensitive PEC pair. Also as noted above, at least one of these compounds/portions is characterized by a degree of ionization which depends upon pH. In embodiments, two distinct compounds are present and one of the compounds is an anionic polymer (or anionic block copolymer). Other than what has already been described, the type of anionic polymer is not particularly limited. In embodiments, the anionic polymer is one which comprises carboxylic acid groups as the ionizable groups of the polymer. An illustrative such anionic polymer is poly(acrylic) acid (PAA). This is a weak acid having a $pK_a$~5.5. Other anionic polymers comprising ionizable groups which are weak acids having similar $pK_a$ values may be used. In embodiments, the anionic polymer is one which comprises phosphoric acid groups or sulfonic acid groups as the ionizable groups of the polymer. Other illustrative anionic polymers include poly(methacrylic acid), alginate, poly(phosphoric acid), poly(aspartic acid), poly(glutamic acid), hyaluronic acid, poly(styrenesulfonate), and poly(vinylsulfonic acid).

In embodiments, two distinct compounds are present in the polyelectrolyte solution and one of the compounds is a cationic species capable of forming the polyelectrolyte complex with the other compound, e.g., with the anionic polymer. In embodiments, the cationic species is a cationic polymer (or cationic block copolymer). Other than what has already been described, the type of cationic polymer is not particularly limited. In embodiments, the cationic polymer is one which comprises amine groups as the ionizable groups of the polymer. An illustrative such cationic polymer is poly(allylamine) HCl (PAH). This is a weak base having a pKa 8.5. Other cationic polymers comprising ionizable groups which are weak bases having similar $pK_a$ values may be used. Other illustrative cationic polymers include poly(diallyldimethylammonium), poly(N-alkyl-4-vinylpyridinium), poly(alkylguanidine), chitosan, poly(ethyleneimine), poly(N,N-dimethylaminoethyl methacrylate), poly(lysine), and poly(arginine). However, the cationic species need not be a cationic polymer, e.g., positively charged particles or metal ions may also be used as cationic species. In embodiments in which the PEC pair is a single compound, the cationic species may be a cationic group on a portion of the single compound, e.g., a cationic group on an anionic polymer.

It is noted that the anionic and cationic polymers of the present disclosure are unmodified compounds. The present anionic and cationic polymers are distinguished from polymers which have been modified to convert existing ionic/ionizable groups (e.g., amine groups) to other ionic/ionizable groups (e.g., carboxylic acid groups) (e.g., unmodified PAH comprising amine groups can be chemically modified to PAHd (dimethylmaleic-modified poly(allylamine) comprising carboxylic acid groups). The present anionic and cationic polymers are also distinguished from polymers which have been modified to add additional ionic/ionizable groups (e.g., to provide both carboxylic acid groups and amine groups in a single polymer). For example, unmodified PAH can be chemically modified to PAHc (citraconate-modified poly(allylamine) comprising both amine and carboxylic acid groups). In embodiments, the present anionic and cationic polymers further do not include functional groups such as carbazole functional groups, alkyne functional groups, and azide functional groups.

In embodiments in which "the pH sensitive PEC pair" refers to two portions of a single compound, the single compound may be a polymer or a block copolymer which comprises both anionic and cationic groups on the polymer/block copolymer. However, in these embodiments, the single polymer/block copolymer is also unmodified as described above with respect to unmodified anionic and cationic polymers.

As noted above, in the present methods, the applied potential is selected to induce an electrochemical reaction of the electrochemical pH agent in the polyelectrolyte solution. Thus, selection of the applied potential is related to the choice of the electrochemical pH agent. At the same time, the applied potential is selected to prevent or minimize the electrolysis of water in the polyelectrolyte solution, i.e., the electrochemical reduction of water (and thus, the formation of $H_2$ gas) or the electrochemical oxidation of water (and thus, the formation of $O_2$ gas). This means that the applied potential in the present methods is outside of the voltage range which would induce water electrolysis in the polyelectrolyte solution. Depending upon the choice of the electrochemical pH agent, cyclic voltammetry experiments may be conducted to determine a suitable range of applied potential. (See FIG. 2.)

As noted above, the electrochemical pH agent is an oxidizing agent or a reducing agent other than water. Otherwise, a variety of oxidizing agents or reducing agents may be used, provided they can be reduced (oxidized) at applied potentials that prevent or minimize water electrolysis in the polyelectrolyte solution. Hydrogen peroxide is an illustrative oxidizing agent since it can be reduced at an applied potential of about −0.5 V (with reference to a Ag/AgCl electrode). Although the electrochemical pH agent may be hydroquinone, in some embodiments, the electrochemical pH agent is not hydroquinone. The concentration of the electrochemical pH agent may be selected to provide a desired local pH, i.e., pH near the surface of the working electrode upon application of the applied potential. The desired local pH may depend, at least in part, on the selected pH sensitive PEC pair. However, in embodiments, the concentration of the electrochemical pH agent is in the range of from about 1 mM to about 200 mM, from about 5 mM to about 150 mM, or from about 10 mM to about 125 mM.

The polyelectrolyte solution may comprise other additives, e.g., salts, and acids/bases to provide a desired bulk pH. The bulk pH may be selected to adjust the charge ratio of the two compounds of the pH sensitive PEC pair in the polyelectrolyte solution and to prevent or minimize premature bulk complexation. In general, the two compounds/portions of the pH sensitive PEC pair are uncomplexed or only weakly complexed in the bulk of the polyelectrolyte solution. This may be confirmed by observing the clarity of the polyelectrolyte solution. Thus, the particular bulk pH depends, at least in part, on the selected pH sensitive PEC pair. Other additives may depend upon the desired application and can include dyes, pigments, inorganic particles, etc. For example, dyes and/or pigments are useful when the polyelectrolyte solution is a paint to be used to coat a particular substrate.

The surface of the working electrode (on which the PEC film is formed) is composed of a conductive material, although the conductive material is not particularly limited. By way of illustration, various metals (e.g., gold, titanium chromium, aluminum, etc.), carbon, indium tin oxide (ITO), etc. may be used. The surface of the working electrode may be planar or non-planar. This is by contrast to conventional methods which require use of a planar substrate.

The present methods may be carried out at room temperature, i.e., in a range of from about 20° C. to about 25° C.

At least some embodiments of the present methods are capable of providing thick PEC films in very short periods of time (e.g., a PEC film having an average thickness of about 1 μm can be formed in about 5 minutes). PEC films having an average thickness in the range of from about 500 nm to about 10 μm may be formed, e.g. from about 500 nm to about 5 μm, or from about 500 nm to about 2 μm. These thickness values may be referenced with respect to the state of hydration of the PEC film. For hydrated PEC films, the thickness may be determined from the areal mass which may be measured using the technique described in the Example, below. (See FIG. 3A.) For dry PEC films, atomic force microscope (AFM) images and profilometry may be used to determine the thickness as described in the Example, below. (See FIG. 8)

The PEC films formed using the present methods may be further characterized by their mechanical properties, e.g., by a shear modulus-density product and/or viscoelastic phase angle. These properties may be determined as described in the Example, below.

The parameters of the present methods may also be tuned to achieve a desired deposition rate, film thickness, film morphology, and mechanical property. In addition to the parameters of the applied potential, the concentration of the electrochemical pH agent, and the bulk pH as described above, these parameters include the concentration of the two compounds/portions of the pH sensitive PEC pair and the concentration of any additives (e.g., salt). In addition to those described above, illustrative values of these parameters are provided in the Example, below.

The methods may be used in variety of applications, including electrodeposition of polymer coatings in the automotive industry.

Example

Introduction

In this Example, a rapid one-pot electrochemical deposition scheme was developed that uses a pH stimulus to trigger the self-assembly of a PEC film composed of poly(acrylic) acid and poly(allylamine) HCl at moderate cathodic potentials, circumventing the electrolysis of water and thereby the evolution of $H_2$ gas. The pH stimulus was generated by exploiting the reduction of $H_2O_2$ at the working electrode of a custom electrochemical quartz crystal microbalance (EQCM), achieving 1 μm films within short time scales (≈5 min). $H_2O_2$ was demonstrated to be an ideal molecule for generating a pH gradient that can induce the self-assembly of a PEC film at the electrode surface, and perform in-situ rheology of the film using the EQCM, monitoring the evolution of its viscoelastic phase angle ($\varphi$) and density-shear modulus product ($\rho|G^*|$). The results showed that the mechanical properties of the deposited PEC film are dependent on the bulk solution pH, working electrode potential and the initial salt, $H_2O_2$ and polymer concentrations. Finally, Finite Element Modeling (FEM) results are presented to aid in understanding the deposition mechanism during the initial stage of film growth.

Experimental Section

Materials.

Poly(acrylic) acid (PAA, molar mass 250,000 g mol$^{-1}$) and poly(allylamine) HCl (PAH, molar mass 60,000 g mol$^{-1}$) were purchased from Polysciences Inc. (Warrington, Pa.). Sodium chloride, sodium sulfate, hydrogen peroxide (35 wt %) and hydrochloric acid (37 wt %) were purchased from Sigma-Aldrich. Deionized water (conductivity ~5 μS/cm) was used for making all solutions.

Electrochemical Quartz Crystal Microbalance.

A custom three-electrode electrochemical quartz crystal microbalance (Advanced Wave Sensors, Valencia, Spain) was used to deposit polyelectrolyte complex films. The EQCM holder was connected to both an N2PK impedance analyzer (Thornhill, ON, Canada) and a potentiostat (Bio-Logic SP-150, Grenoble, France). Electrodeposition was conducted using a silver chloride reference electrode (Ag/AgCl) and a platinum counter electrode. All potentials reported in the present disclosure are referenced to the Ag/AgCl electrode. AT-cut, 1 inch, 5 MHz quartz crystals with an 1.27 cm$^2$ working Au electrode (Stanford Research Systems, Sunnyvale, Calif.) were used as manufactured.

The mathematical approach for obtaining viscoelastic information from QCM experiments has been described previously as an analysis that can be extended to data obtained from the Q-sense instrument[36,37]. Details are also found in Sadman, K. et al., Langmuir, 2017, 33 (8), 1834-1844, which is hereby incorporated by reference in its entirety.

Electrodeposition.

Deposition was carried out in solutions containing 0.250% PAH and 0.192% (w/v) PAA (26.7 mM repeat units each). The pH was adjusted to the desired experimental value using HCl and then sodium chloride and hydrogen peroxide were added. For each experiment, the resonance frequencies of the bare crystal in air at the first and third harmonics were recorded. Next, the resonance frequencies of the crystal immersed in the prepared polymer solution were recorded with reference to the bare crystal in air. The open circuit potential (OCV) of the electrochemical cell was monitored for 30 seconds before electrodeposition was carried out at −0.5 V vs. Ag/AgCl while the QCM measured the shifts in frequency ($\Delta f_n$) and dissipation ($\Delta \Gamma_n$) at the 1st and 3rd harmonics, which were recorded in solution. All experiments were conducted at room temperature.

Dynamic Light Scattering.

Dynamic light scattering was performed using a Malvern Zetasizer Nano S (Worcestershire, UK) system at 25° C. using a 173° backscatter angle. The refractive index (1.330) and viscosity (8.87×10$^{-4}$ Pa·s) of water at 25° C. were used as the dispersant properties; the refractive index and attenuation coefficient of the polymer were estimated as 1.45 and 0.001, respectively. The average±one standard deviation of four measurements was reported at each condition.

Finite Element Modeling.

Finite element modeling was performed using COMSOL Multiphysics 5.2 with a Corrosion Module using our previously reported approach to calculate the proton and peroxide depletion rates at the electrode surface during the initial period of film growth[38]. Details are also found in Sadman, K. et al., Langmuir, 2017, 33 (8), 1834-1844, which is hereby incorporated by reference in its entirety.

Atomic Force Microscopy.

The morphological features of electrodeposited PEC films were examined using tapping mode on a Dimension Fast-Scan AFM with ScanAsyst (Bruker Co., Billerica, Mass.). AFM images were obtained in air at rate of 0.50 Hz with scan sizes of 25×25 μm. Films for AFM imaging were obtained after approximately 6 minutes of deposition by removing the electrode from solution while maintaining the potential to limit film dissolution. Films were then dried in air.

Results and Discussion

Electrodeposition of polyelectrolytes has been studied in great detail in the context of a weak polyelectrolyte becoming insoluble at an electrode surface by losing its charge due to a pH gradient. For example, the cathodic neutralization of the aminopolysaccharide chitosan causes it to precipitate out of solution in response to an applied potential[42,43]. Electrodepostion schemes have been extended to polyelectrolyte-inorganic particle composites to obtain a variety of functional coatings[44,45]. PEC film electrodeposition is desirable as it allows spatiotemporal control over the film growth process in a high-throughput and versatile way. However, in addition to the issue of establishing a pH gradient at moderate potentials (to avoid water electrolysis), it is necessary to exclusively initiate the electrostatic complexation of the polyelectrolytes at the electrode surface such that a coating can be obtained. This is challenging under low salt conditions (<1.0 M salt) because polyanions and polycations immediately form precipitates upon mixing. The approach demonstrated in this Example utilizes the cathodic reduction of $H_2O_2$ at a moderate potential (−0.5 V) in an acidic solution (pH~2) to alkalize the vicinity of the electrode and prompt the electrostatic self-assembly a PEC film composed of the weak polyelectrolytes PAA (p$K_a$~5.5) and PAH (p$K_a$~8.5). The acidic conditions fully protonate PAA, thereby precluding premature complexation of PAA and PAH in the bulk. The reduction of $H_2O_2$ at the cathode initiates the local electrostatic complexation of the polyelectrolytes by slowly deprotonating PAA (PAH remains in its cationic form). Water reduction does not proceed at this potential, thus facilitating the formation of a homogeneous film. Furthermore, the in-situ mechanical response of the PEC film was probed by performing its electrodeposition using an EQCM as schematically outlined in FIG. 1. The results are presented in the following sections, beginning with the electrochemical behavior of $H_2O_2$.

Electrochemical Behavior of $H_2O_2$.

Figure 2:
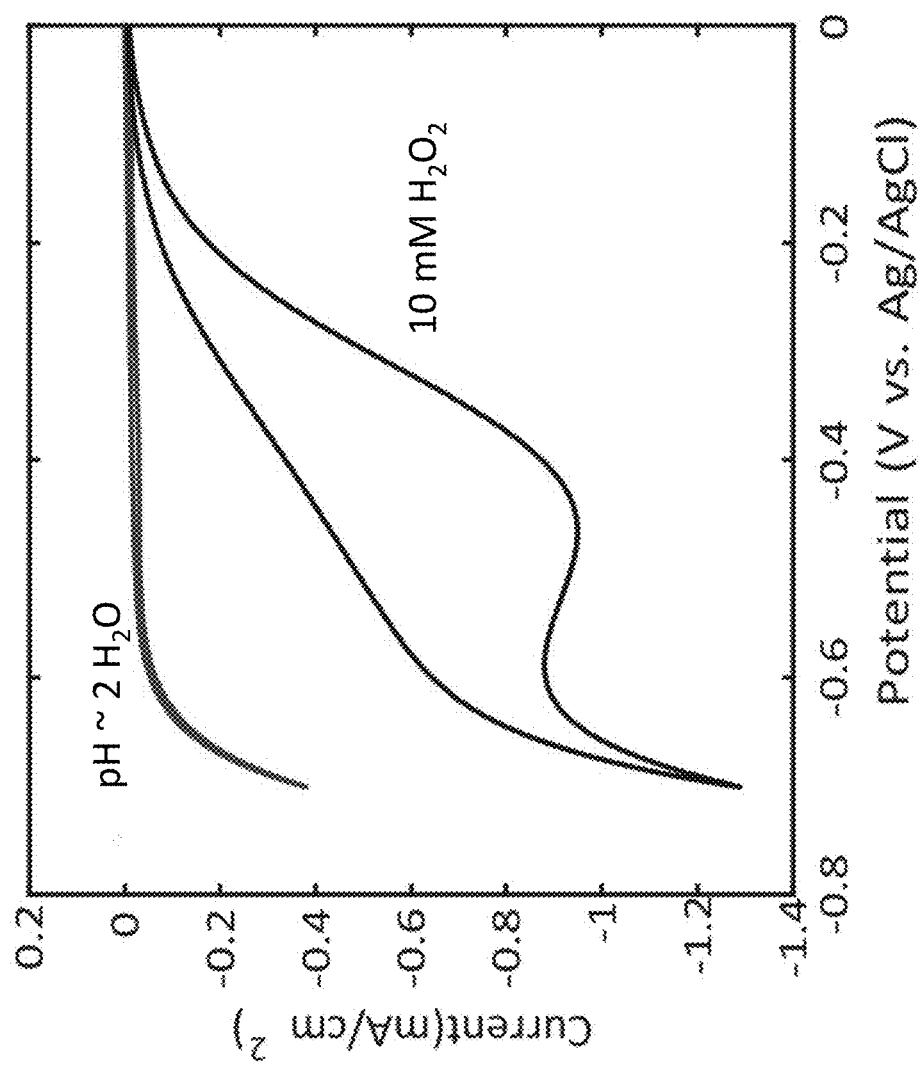
FIG. 2 shows cyclic voltammograms of water and 10 mM $H_2O_2$ obtained in a pH 2 solution with 1 M $Na_2SO_4$ acting as the supporting electrolyte. The scan rate was 20 mV/s vs. a Ag/AgCl reference electrode.

FIG. 2 shows the cyclic voltammograms for water and hydrogen peroxide obtained in a pH 2 solution with an Au working electrode. Without peroxide, the current remains close to zero, indicating that no water reduction is occurring at these potentials. When 10 mM of peroxide is added to the solution, a significant increase in the reduction current is observed, with the current commencing around −0.1 V and peaking around −0.45 V. Comparing the voltammograms of water and peroxide, it is evident that the large reduction current is solely due to peroxide reduction. Gerlache et al. and Stewart et al. have previously reported similar reduction behavior of peroxide, and have offered some mechanistic insights for the chemical steps involved[46,47]. Gerlache et al. studied the effect of pH and peroxide concentration on the voltammogram, while Stewart et al. concluded that the peroxide reduction in an acidic environment involves the dissociative adsorption of peroxide molecules on to a metal surface via the formation of metal-OH species. These metal-OH species are subsequently reduced at cathodic potentials, forming OH$^-$ that can neutralize H$^+$ ions in solution via the following overall mechanism: $H_2O_2 + 2H^+ + 2e^- \rightarrow 2H_2O$. Exploiting the reduction of $H_2O_2$ to generate a pH gradient has the following advantages: $H_2O_2$ reduces at moderate potentials; no $H_2$ gas is generated since water electrolysis is avoided; and the reaction product is simply water, the original solvent.

Circumventing the electrolysis of water to generate a pH gradient is essential for achieving uniform films. Furthermore, it enables the mathematical approach (which assumes uniform contact at the film-electrode interface) for extracting viscoelastic parameters from a film deposited on a QCM. The in-situ rheology of the deposited PEC film is discussed in the next section.

Rheology of the Electrodeposited PEC Film.

Figure 3C:
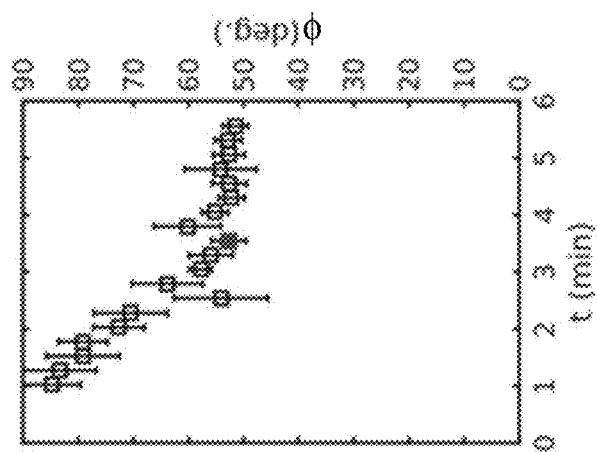
Figure 3B:
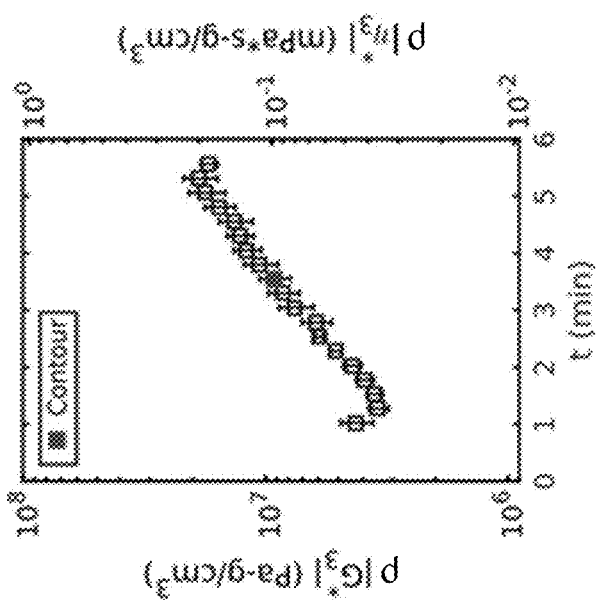
FIGS. 3A-3B show the electrodeposition of a PEC film from a solution of pH 1.95, 120 mM $H_2O_2$, 30 mM NaCl, and 26.7 mM PAH and PAA, respectively.
Figure 3A:
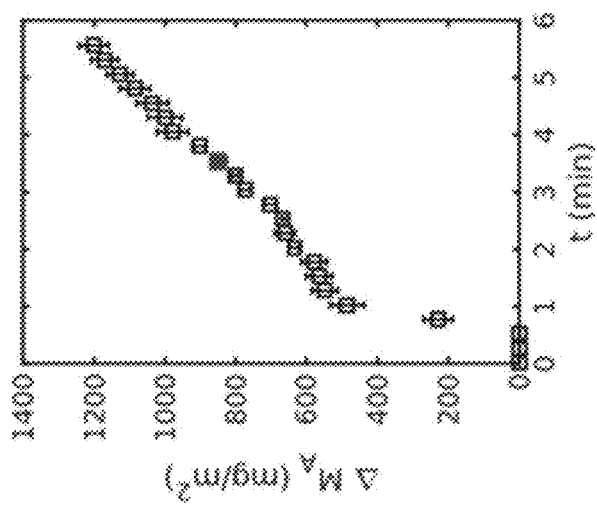

Under acidic conditions, PAH and PAA form weak complexes, but if the pH is raised to the vicinity of 5.5 (p$K_a$ of PAA), an insoluble polyelectrolyte complex precipitates from solution[48]. This phenomenon presents the opportunity to controllably induce the self-assembly of a PEC film at an electrode by providing an appropriate local pH stimulus. At a cursory glance, the electroreduction of water could induce a pH gradient, however, this approach has several drawbacks, most notably the very low potentials (<−1.0V) necessary to reduce water, and the formation of $H_2$ gas which would interfere with the film deposition process. In the previous section it was demonstrated that hydrogen peroxide reduces at intermediate potentials and that the reduction reaction consumes protons locally at working electrode surface, raising the pH. FIGS. 3A-3C present the evolution of the mechanical properties of a PEC film deposited from a pH of 1.95 and 26.7 mM PAH and PAA by setting the electrode potential to −0.5 V.

At a pH of 1.95 the mixture was clear, indicating that the polyacid and the polybase were very weakly complexed. The turbidity of the solution was observed to increase when the pH exceeded 2. According to the results of FIGS. 3A-3C, rapid film deposition began about 30 s after the potential at the working electrode was set, followed by a linear increase in the areal mass (FIG. 3A), an increase in the density-modulus product (FIG. 3B), and a decrease in the phase angle (FIG. 3C). Assuming that the density of the deposited PEC layer in FIGS. 3A-3C is about 1 g/cm$^3$ (a reasonable approximation for a highly hydrated film), an areal mass of 1200 mg/m$^2$ corresponds to a 1.2 μm thick film, a significant improvement over conventional layer-by-layer techniques considering the short time scale of this experiment[20,32,49,50]. Polyelectrolyte multilayers typically grow via a slow initial "linear" regime followed by a faster "exponential" regime, and in certain cases can yield micron thick films within ~15 bilayers[20,32,50]. Each bilayer addition can take ~20 minutes when adsorption times and washing steps are considered. Using the electrodeposition method of this Example, the multiple-step LbL process is simplified to a single continuous process with a faster and linear control over the thickness. The polyelectrolyte complex film was found to have a density-shear modulus product on the order of 10$^7$ Pa g/cm$^3$ at 15 MHz (n=3) and a viscoelastic phase angle at 15 MHz of about 50° ($\phi$=0 for purely elastic materials and 90 for Newtonian liquids). It is interesting that the film becomes more elastic as it increases in thickness, a phenomenon attributed to the increasing polymer volume fraction in the film as it evolves.

These values compliment the low-frequency mechanical test results previously reported for polyelectrolyte multilayers. Han et al. performed AFM nanoindentation of the PAA/PAH system, reporting modulus values as a function pH and ionic strength on the order of megapascals[51]. Jaber et al. performed dynamic mechanical tests on the PDADMA/PSS system, with moduli on the order of few megapascals and phase angles between 10 and 40°[52,53]. The larger moduli and lower viscosities obtained in this Example are consistent with the much higher frequency of the QCM measurement in comparison to traditional dynamic mechanical tests[1,14,52,53]. The modulus values obtained in this Example also agree reasonably well with previously reported values for PAA/PAH multilayers using QCM-D[49,54]. The magnitude of the complex viscosity at 15 MHz, which is referred to as $\eta_3^*$, provides a more straightforward comparison to the properties of the polyelectrolyte complex film in comparison to water. Water has a frequency-independent viscosity of ≈1 mPa s (10$^{-3}$ Pa s) at room temperature. The magnitude of the complex viscosity of the films corresponding to FIG. 3B are 200 times this value, assuming a film density of 1 g/cm$^3$.

The ability to quantify mechanical properties of an adsorbed film with the QCM requires that measurable deviations from the Sauerbrey equation are observed. If a film is too thin it will fall under the Sauerbrey regime, where no information about viscoelastic properties can be obtained. The QCM is only sensitive to the mass loading here. For films of intermediate thicknesses, the mass loading, modulus and phase angle can be calculated by quantifying the deviation from the Sauerbrey regime[37]. This is the regime used for this Example, and it is 600-2000 nm. While viscoelastic information can be obtained from thinner films[35,49,55], the inherent error in the properties extracted in this regime are much larger than in the thickness regime used in this Example. Indeed, it is possible to deposit films much greater than 1 μm using the electrochemical approach of this Example. For very thick films, however, the crystal resonance is damped so strongly that it is no longer possible to obtain useful information with the QCM. It is important to recognize, however, that in almost all cases the Sauerbrey equation is still accurate to within 10 or 20 percent, provided that one is only interested in the film mass. This is illustrated in FIG. 4A, where the ratio of ρd obtained from the complete viscoelastic analysis to the value of ρd obtained from the Sauerbrey equation is plotted. For sufficiently thick films, the Sauerbrey equation will become quite inaccurate, since the frequency shift becomes independent of d when d is much larger than the decay length, δ. However, for this Example, the film thickness is always less than δ, as shown in FIG. 4B. These values of δ were obtained from the values of $\phi_n$ and $\rho|G_n^*|$ obtained from the full viscoelastic solution. Therefore, this Example was being conducted in a thickness range where d is large enough so that values of the viscoelastic properties of the film can be obtained from the deviations to the Sauerbrey equation, but small enough so that measured frequency and dissipation shifts are sensitive to the total film mass.

Figure 5A:
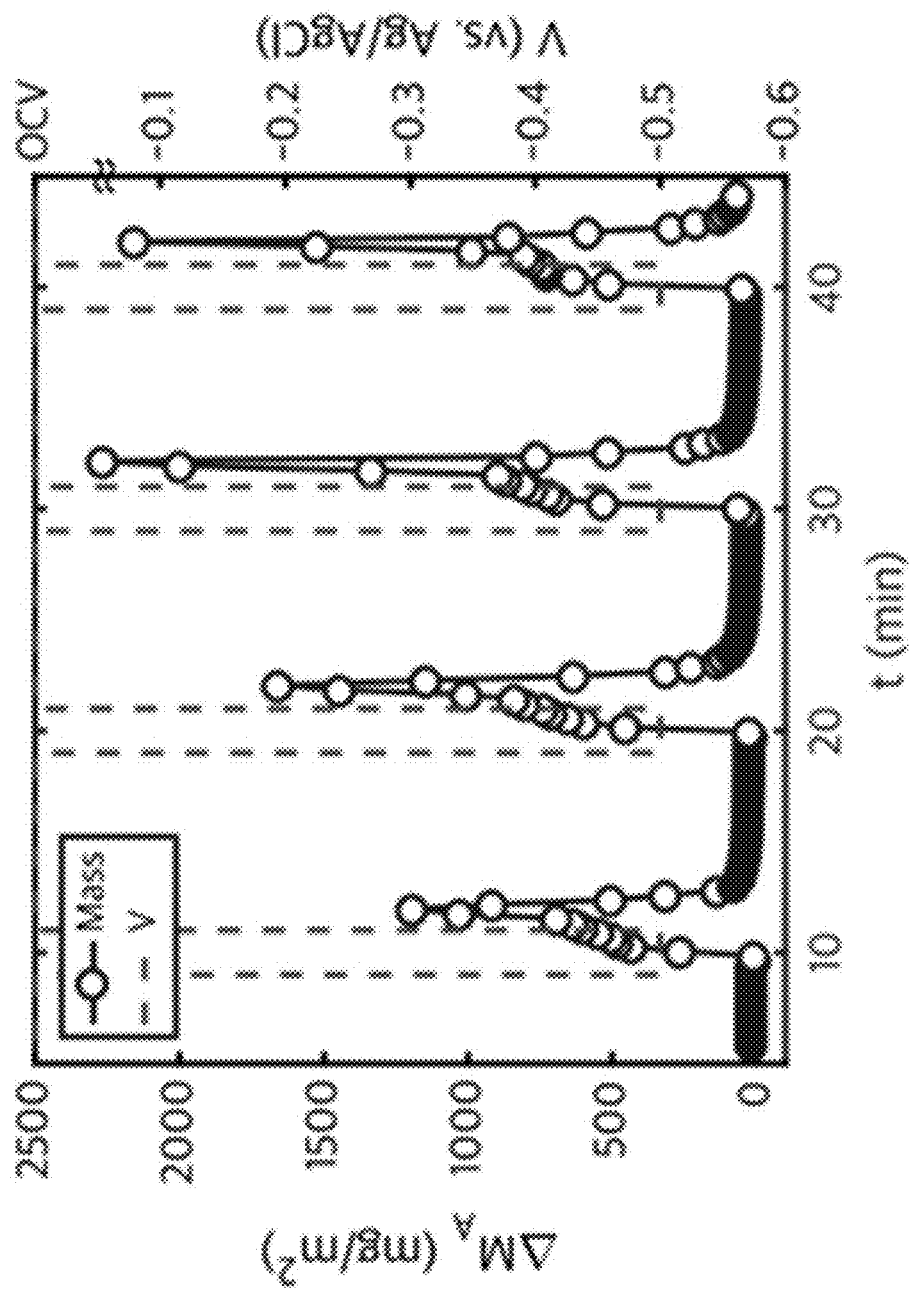
FIGS. 5A-5D show potential step tests conducted in a solution of pH 1.95, 120 mM $H_2O_2$, 30 mM NaCl, 26.7 mM PAH and PAA each. Two minute potential steps were applied from the open circuit potential (OCV≈0.6 V) to −0.5 V (FIG. 5A), and sequentially decreased from −0.35 V to −0.55 V at −0.05 V increments (FIG. 5B).
Figure 5B:
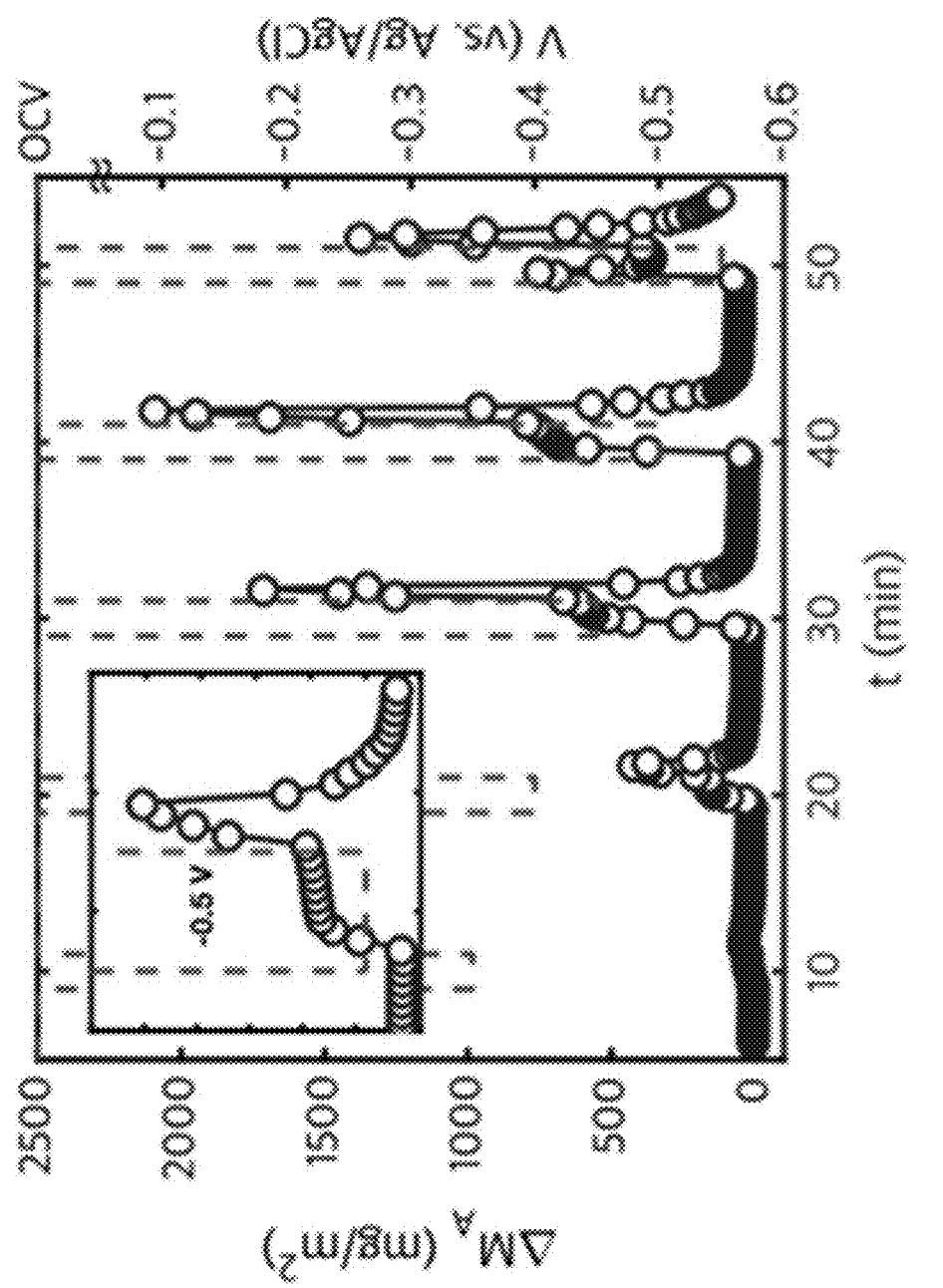
Figure 5C:
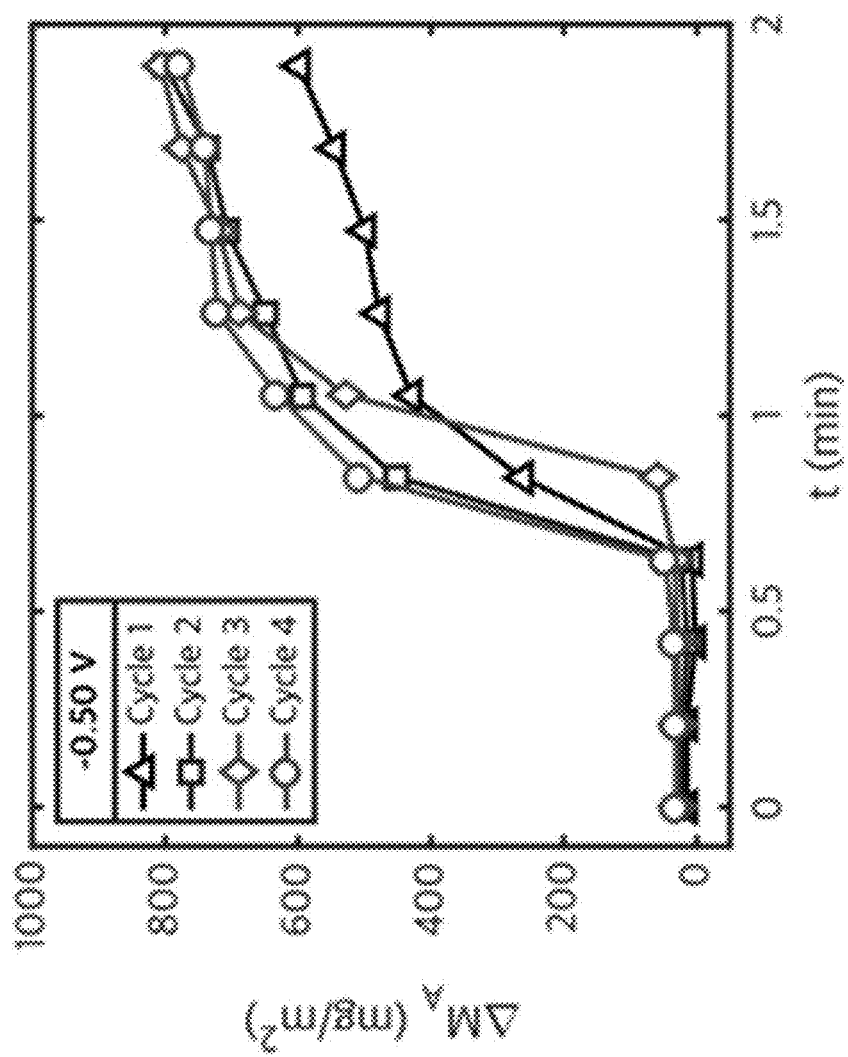
Figure 5D:
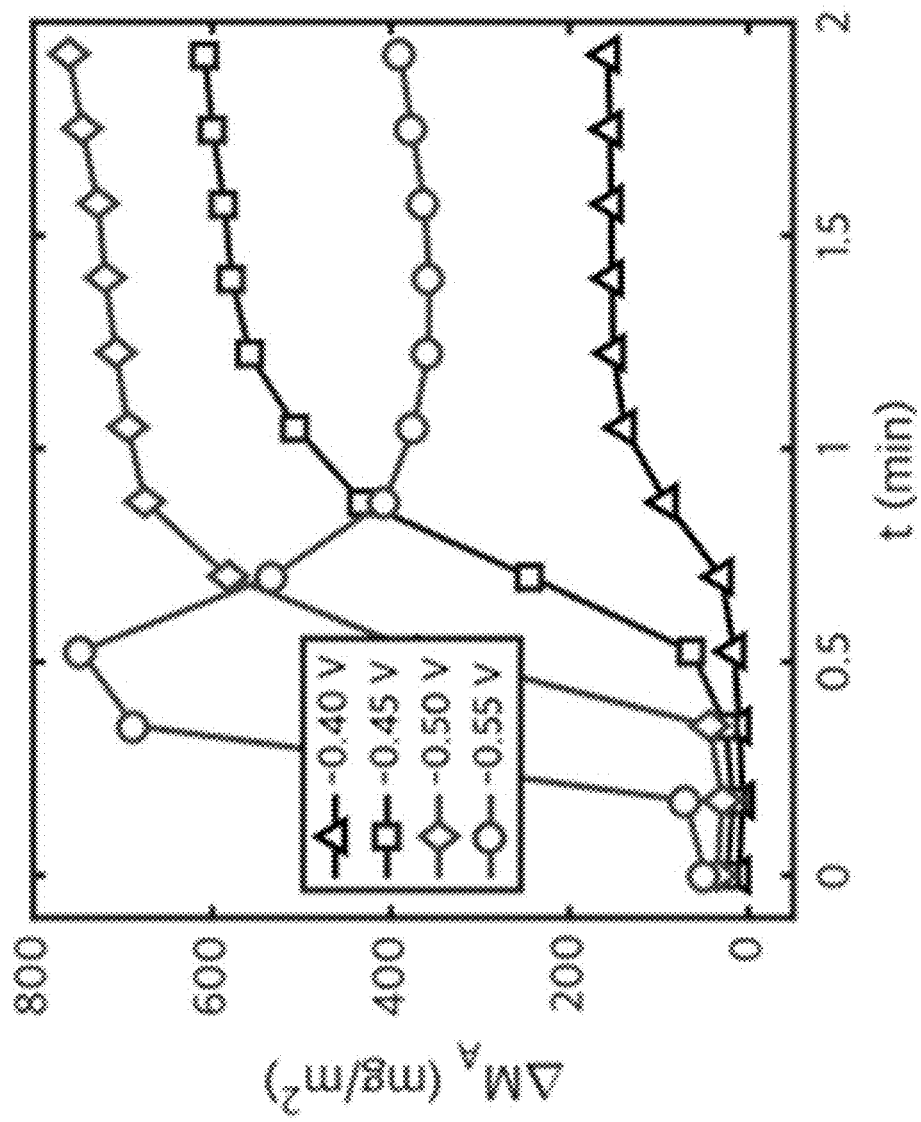

The voltammetry performed in FIG. 2 provided an initial guess for setting the working electrode potential, but it was speculated that changing the potential would greatly affect the rate of mass deposition. To investigate this further, potential step tests were performed in which the potential at the working electrode was cycled between the open circuit potential (≈0.6 V) and the deposition potential (≈−0.5 V). FIG. 5A shows that there was a small delay (≈30 s) between the time when the potential was switched on and the time of mass increase. The mass continued to increase linearly while the potential was maintained, and spiked immediately as the potential is switched back to the open circuit potential. The spike in mass corresponded with a spike in the dissipation shift, suggesting that the film swelled before dissolving away at this low solution pH. This pH dependent swelling behavior of PAA/PAH has been documented previously for multilayers, and the electrodeposited films in this Example appear to behave similarly[56]. Next, the potential was stepped from −0.35 V to −0.55 V in increments of −0.05 V, as shown in FIG. 5B. Negligible mass increase was recorded at −0.35 V, but the deposited mass scaled with the potential decrease thereafter. At the final potential of −0.55 V, a mass increase was observed followed by a quick decrease before swelling and dissolution (FIG. 5D). A film could not be maintained at this potential without lowering the salt concentration, suggesting that there is an interplay between salt, potential and pH that determines film mechanical properties and stability. This coupling of process variables has been previously observed[28,33,57].

Numerical Modeling and Acid-Base Titrations.

Figure 6:
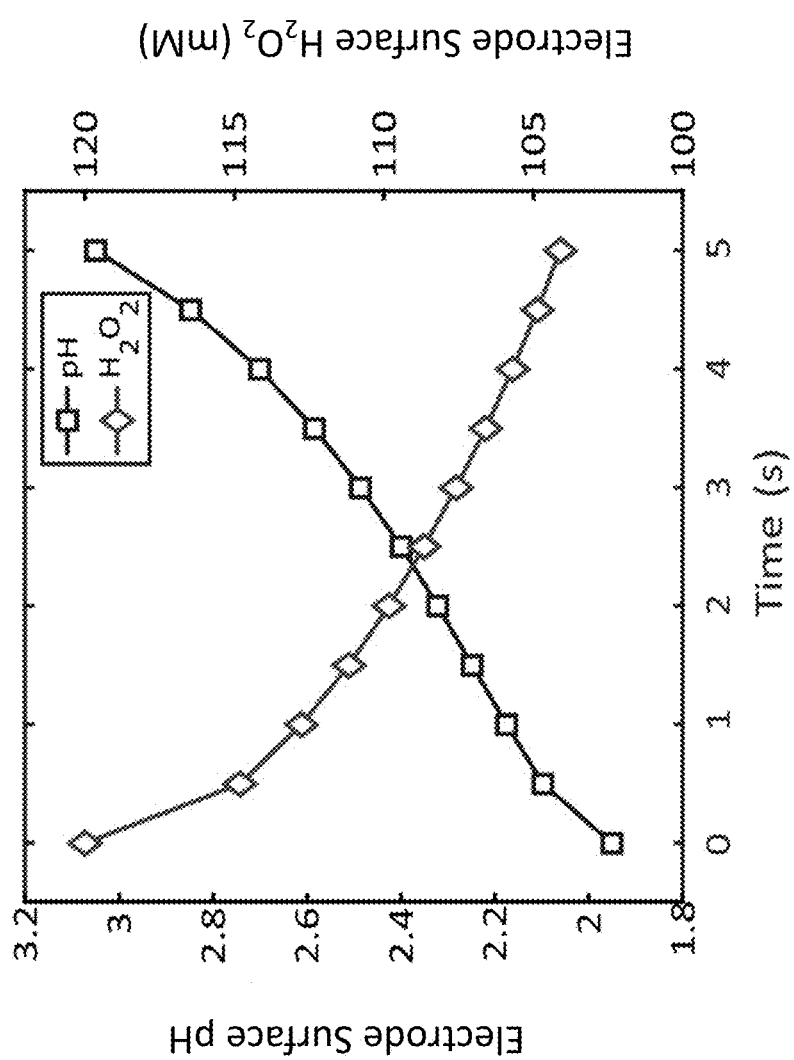
FIG. 6 shows the numerical modeling results displaying the pH evolution and hydrogen peroxide depletion at the electrode-electrolyte interface, i.e., at a distance x=0 from the electrode.

Numerical modeling was performed to quantify the pH and hydrogen peroxide concentration at the electrode surface during the initial stages of film growth. Modeling was not performed beyond the initial period due to difficulties in quantifying diffusion through a polymer film that is growing as a function of time. The aim of this portion of the Example was to understand the rate of proton and hydrogen peroxide depletion at the electrode-electrolyte interface. The current density at the working electrode boundary was specified to be the current measured from the data presented in FIGS. 3A-3C. FIG. 6 plots the surface pH and peroxide concentration as a function of time after a step change in the electrode potential from open circuit to −0.5 V. During film deposition, a significant shift in the quartz resonant frequency was not observed until 30 s after the potential was switched on. This delay in response may be due to the time required to raise the pH sufficiently to precipitate out a polyelectrolyte complex. The modeling suggests that the pH increases about one unit within the first few seconds, corresponding with a drop in the local peroxide concentration, as shown in FIG. 6.

Figure 7C:
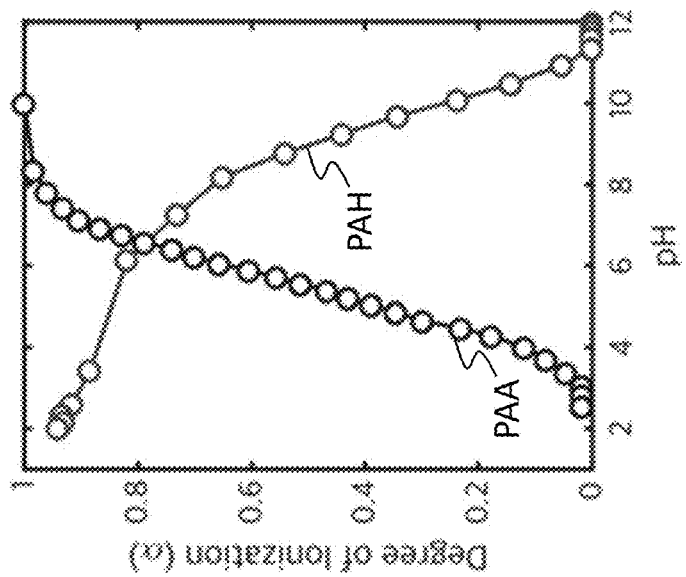
FIGS. 7A-7C show titration curves for 26.7 mM PAA (FIG. 7A) and PAH (FIG. 7B) dissolved in 30 mM NaCl. The blank "solvent" consisted of just 30 mM NaCl in deionized water.
Figure 7B:
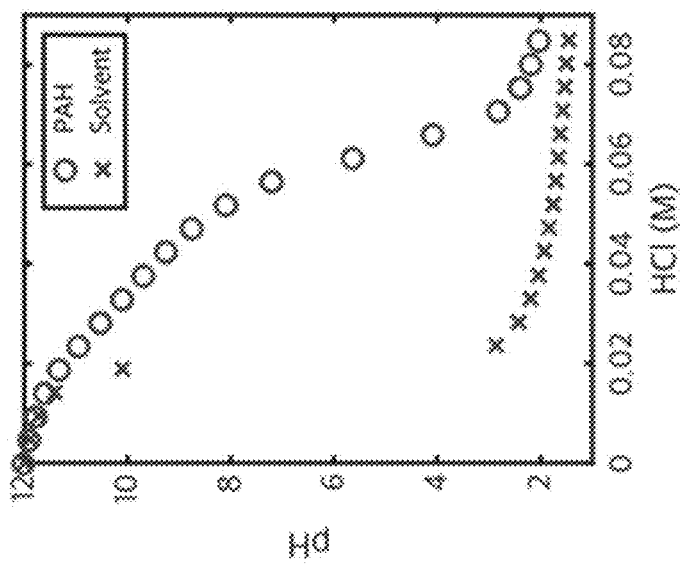
Figure 7A:
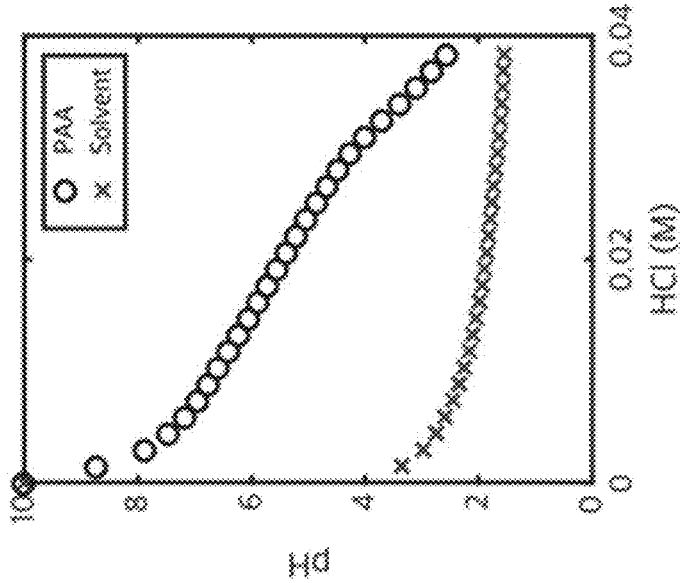

A change in pH would result in a change in the degree of ionization ($\alpha$) of PAA and PAH, thus causing a time dependent complexation at the electrode-electrolyte interface. The extent of complexation depends on the relative degrees of ionization of each polymer chain. To calculate a as a function of pH, acid-base titrations were conducted to determine the fraction of protonated monomer units ($f_p$) for each polymer. "Solvent" solutions were prepared with 30 mM NaCl, whereas the "PAH" and "PAA" solutions contained 0.250% and 0.192% (w/v) (26.7 mM), respectively. No solutions contained hydrogen peroxide. After raising the pH of the solutions to 12 using NaOH, HCl was added in increments while a pH meter simultaneously measured the solution pH. The fraction of protonated amine/acid groups, $f_p$, at each incremental addition of HCl was determined by:

$$f_p = \frac{10^{-pH_s} - 10^{-pH_p}}{[monomer]_{tot}}$$

where $pH_p$ and $pH_s$ are the pH values of the solutions with and without any polymer, respectively. $[Monomer]_{tot}$ is the total molar concentration of protonizable amine/acid functional groups, determined from the dissolved polymer concentration. For PAH, $\alpha$ is simply equal to $f_p$, while for PAA it is equal to $(1-f_p)$. FIGS. 7A and 7B show the titration curves for PAH and PAA, and FIG. 7C displays a as a function of pH. A $pK_a$ of about 5.5 was observed for PAA and 8.8 for PAH under the low salt conditions used in this Example, similar to previously reported literature values[59-61].

At pH 2, PAH was found to be about 96% charged at this concentration while PAA was completely uncharged. According to the modeling results, the electrode surface pH was about 3 after 5 s, which corresponds to PAA and PAH being roughly charged at 2% and 92%, respectively, according to the titration of the individual polymers. The situation was markedly different when both PAA and PAH were presented together at this pH. The presence of fully charged PAH effectively increases the solubility of PAA by shifting the equilibrium towards ion pairing. PAA was thereby deprotonated at a lower pH than what one would expect from the degree of ionization behavior of PAA individually. Petrov et al. previously demonstrated this phenomenon in detail by performing titrations for various PAA/PAH systems[59]. Dynamic light scattering was used to monitor the hydrodynamic radii of PAA, PAH and their complexes as a function of pH as listed in Table 1, below, and significant aggregates were observed to form at pHs as low as 2.1. The Z-average radius and the peak of the volume percent vs. size distribution ($R_v$) were reported. As expected, both of these metrics of the complex size appeared to increase with pH.

Table 1.

Hydrodynamic radii of PAH, PAA, and the PAA/PAH complex at different pH. The concentration of each polymer was 26.7 mM, and the NaCl concentration was 30 mM. The error reported is one standard deviation of four measurements.

TABLE 1

Hydrodynamic Radii of PAH, PAA, and the PAA/PAH Complex at Different pH Values[a]

| system | pH | $R_v$ (nm) | Z-av radius (nm) |
| --- | --- | --- | --- |
| PAH | 2 | 5.4 ± 0.4 | 39.5 ± 4.7 |
| PAA | 2 | 27.8 ± 5.6 | 111.3 ± 30.4 |
| PAA/PAH | 1.9 | 14.6 ± 3.2 | 112.4 ± 14.7 |
| PAA/PAH | 2 | 28.4 ± 4.1 | 152.1 ± 11.5 |
| PAA/PAH | 2.1 | 59.1 ± 8.8 | 192.4 ± 18.3 |
| PAA/PAH | 2.2 | 85.0 ± 23.7 | 151.1 ± 21.2 |

[a]The concentration of each polymer was 26.7 mM, and the NaCl concentration was 30 mM. The error reported is one-standard deviation of four measurements.

Film Morphology.

Figure 8:
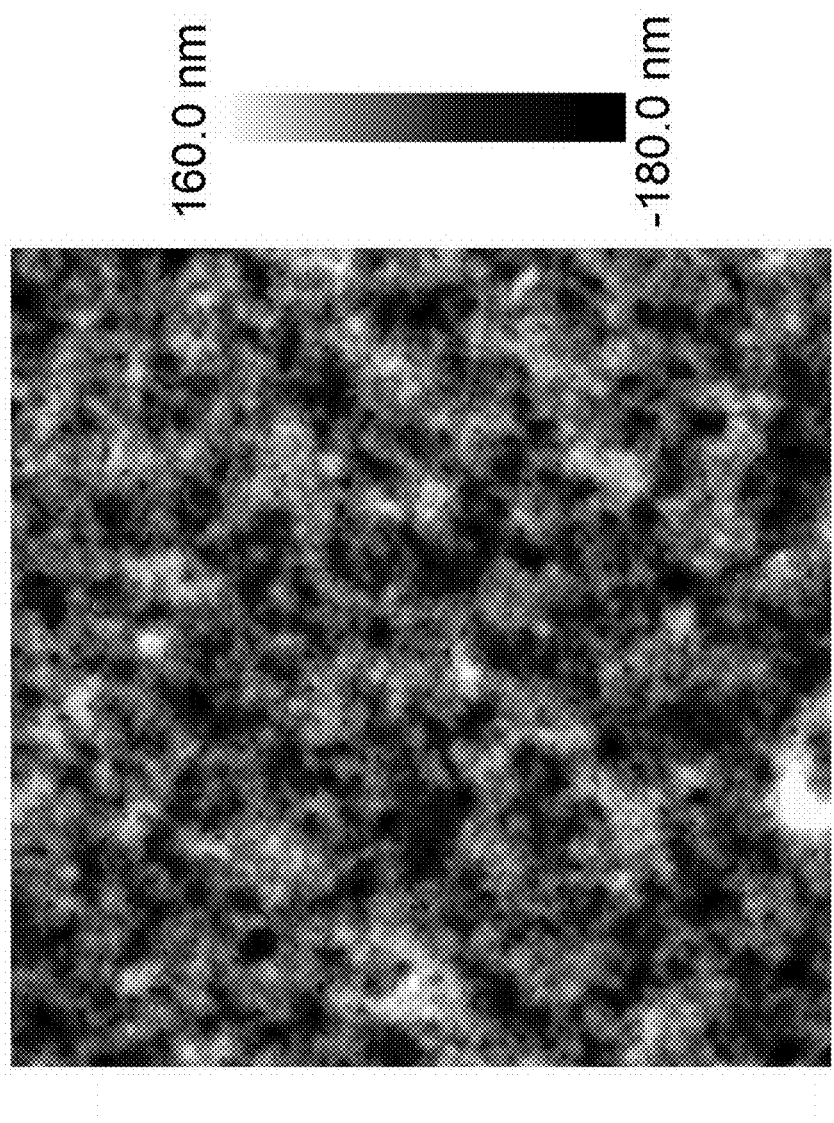
FIG. 8 shows an atomic force microscope (AFM) image of a dried electrodeposited PEC film prepared with the same conditions outlined in FIGS. 3A-3C. The scan area was 25 by 25 μm with a root-mean-square roughness of 49 nm. The dry average thickness of the film from five measurements was determined to be 748±51 nm using profilometry.

The pH is known to strongly affect the morphology of PAA/PAH multilayers even when exposed to acidic conditions for short period of times[56]. What could be the structure of rapidly electrodeposited PAA/PAH films using a time-dependent pH gradient? Under the low salt conditions utilized in this Example it is possible that the complex size indicated by $R_v$ in Table 1 are nanoprecipitates rather than coacervate-like phases, which would suggest a mechanism of precipitation in solution followed by nucleation at the electrode. Cho et al. reported that LbL films exhibited morphological changes under potential biases (4.0 V vs. Ag/AgCl) resulting from the local pH change and water oxidation[23]. These films showed changing porosity and roughness based on the duration of the applied potential, with the root-mean-square (RMS) roughness becoming as high as 90 nm. Since PEC films were electrodeposited under mild reducing potentials, gas bubble induced porosity or roughness in the films was not expected. However, if the mechanism of deposition is precipitation in solution followed by adsorption to the surface, it could be a source of porosity and roughness. FIG. 8 shows an AFM image of a dried electrodeposited PEC film taken out of solution immediately after deposition. This film possessed a RMS roughness of 49 nm and an assortment of pore-like structures. Qualitatively, since the deposition rate of the films are quite fast, highly non-equilibrium structures are formed that are essentially frozen. Carefully controlling the rate of deposition will result in smoother films. Annealing in subsequent salt solutions will also swell and smooth these films as has been reported previously[15].

CONCLUSION

In this Example, a facile electrochemical deposition technique was developed for rapidly depositing a polyelectrolyte complex (PEC) film at the electrode of an electrochemical quartz crystal microbalance (EQCM) by exploiting the reduction of hydrogen peroxide to trigger the pH responsive self-assembly of PAH and PAA. This approach yielded thick PEC films (1 μm) within short experimental time scales (5 min). It was demonstrated that hydrogen peroxide is an ideal molecule for inducing the pH gradient due to its simple chemistry, moderate reduction potential, and absence of a gaseous product. The EQCM was used to quantify the in-situ viscoelastic properties of a PEC film by observing the deviation in the complex frequency shift from the Sauerbrey prediction. Using this approach, the areal mass ($\rho d$), the density-modulus product ($\rho |G_n^*|$) and the viscoelastic phase angle ($\phi_n$) were determined as a function of time during electrodeposition. Our calculation indicated that the film that formed at the working electrode had a phase angle of about 50° and a density-modulus product of around $10^7$ Pa g/cm$^3$ at 15 MHz and after five minutes of deposition. Finally, finite element modeling results were presented to guide the intuition behind the time evolution of the pH gradient at the electrode surface, showing that the pH rises by one unit within the first 5 s of deposition, with a complimentary drop in the hydrogen peroxide concentration.

REFERENCES (1) Wang, Q.; Schlenoff, J. B. The Polyelectrolyte Complex/Coacervate Continuum. *Macromolecules* 2014, 47, 3108-3116.
(2) Perry, S. L.; Li, Y.; Priftis, D.; Leon, L.; Tirrell, M. The Effect of Salt on the Complex Coacervation of Vinyl Polyelectrolytes. Polymers 2014, 6, 1756-1772.
(3) Wood, K. C.; Boedicker, J. Q.; Lynn, D. M.; Hammond, P. T. Tunable Drug Release from Hydrolytically Degradable Layer-by-Layer Thin Films. *Langmuir* 2005, 21, 1603-1609.
(4) Peterson, A. M.; Pilz-Allen, C.; Kolesnikova, T.; Mohwald, H.; Shchukin, D. Growth Factor Release from Polyelectrolyte-Coated Titanium for Implant Applications. *ACS Appl. Mater. Interfaces* 2014, 6, 1866-1871.
(5) Park, J.; Park, J.; Kim, S. H.; Cho, J.; Bang, J. Desalination membranes from pHcontrolled and thermally-crosslinked layer-by-layer assembled multilayers. *J. Mater. Chem.* 2010, 20, 2085-2091.
(6) Andreeva, D. V.; Fix, D.; Mohwald, H.; Shchukin, D. G. Self-Healing Anticorrosion Coatings Based on pH-Sensitive Polyelectrolyte/Inhibitor Sandwichlike Nanostructures. *Adv. Mater.* 2008, 20, 2789-2794.
(7) Gherasim, C. V.; Luelf, T.; Roth, H.; Wessling, M. Dual-Charged Hollow Fiber Membranes for Low-Pressure Nanofiltration Based on Polyelectrolyte Complexes: OneStep Fabrication with Tailored Functionalities. *ACS Appl. Mater. Interfaces* 2016.
(8) Zhao, Q.; An, Q. F.; Ji, Y.; Qian, J.; Gao, C. Polyelectrolyte complex membranes for pervaporation, nanofiltration and fuel cell applications. *J. Membr. Sci.* 2011, 379, 19-45.
(9) Zhao, Q.; Lee, D. W.; Ahn, B. K.; Seo, S.; Kaufman, Y.; Israelachvili, J. N.; Waite, J. H. Underwater contact adhesion and microarchitecture in polyelectrolyte complexes actuated by solvent exchange. *Nat. Mater.* 2016, 15, 407-412.
(10) Kim, S.; Huang, J.; Lee, Y.; Dutta, S.; Yoo, H. Y.; Jung, Y. M.; Jho, Y.; Zeng, H.; Hwang, D. S. Complexation and coacervation of like-charged polyelectrolytes inspired by mussels. *PNAS* 2016, 201521521.
(11) Shiratori, S. S.; M. F. Rubner. pH-Dependent Thickness Behavior of Sequentially Adsorbed Layers of Weak Polyelectrolytes. *Macromolecules* 2000, 33, 4213-4219.
(12) Farhat, T. R.; Schlenoff, J. B. Corrosion Control Using Polyelectrolyte Multilayers. *Electrochem. Solid-State Lett.* 2002, 5, B13-B15.
(13) Priftis, D.; Megley, K.; Laugel, N.; Tirrell, M. Complex coacervation of poly(ethyleneimine)/polypeptide aqueous solutions: Thermodynamic and rheological characterization. *J. Colloid Interface Sci* 2013, 398, 39-50.
(14) Spruijt, E.; Cohen Stuart, M. A.; van der Gucht, J. Linear Viscoelasticity of Polyelectrolyte Complex Coacervates. *Macromolecules* 2013, 46, 1633-1641.
(15) Dubas, S. T.; Schlenoff, J. B. Swelling and Smoothing of Polyelectrolyte Multilayers by Salt. *Langmuir* 2001, 17, 7725-7727.
(16) Itano, K.; Choi, J.; Rubner, M. F. Mechanism of the pH-Induced Discontinuous Swelling/Deswelling Transitions of Poly(allylamine hydrochloride)-Containing Polyelectrolyte Multilayer Films. *Macromolecules* 2005, 38, 3450-3460.
(17) Hammond, P. T. Engineering materials layer-by-layer: Challenges and opportunities in multilayer assembly. *AIChEJ.* 2011, 57, 2928-2940.
(18) Kelly, K. D.; Schlenoff, J. B. Spin-Coated Polyelectrolyte Coacervate Films. *ACS Appl. Mater. Interfaces* 2015, 7, 13980-13986.
(19) Vozar, S.; Poh, Y.-C.; Serbowicz, T.; Bachner, M.; Podsiadlo, P.; Qin, M.; Verploegen, E.; Kotov, N.; Hart, A. J. Automated spin-assisted layer-by-layer assembly of nanocomposites. *Review of Scientific Instruments* 2009, 80, 023903.
(20) Bieker, P.; Schönhoff, M. Linear and Exponential Growth Regimes of Multilayers of Weak Polyelectrolytes in Dependence on pH. *Macromolecules* 2010, 43, 5052-5059.
(21) Schaaf, P.; Voegel, J.-C.; Jierry, L.; Boulmedais, F. Spray-Assisted Polyelectrolyte Multilayer Buildup: from Step-by-Step to Single-Step Polyelectrolyte Film Constructions. *Adv. Mater.* 2012, 24, 1001-1016.
(22) Xu, L.; Pristinski, D.; Zhuk, A.; Stoddart, C.; Ankner, J. F.; Sukhishvili, S. A. Linear versus Exponential Growth of Weak Polyelectrolyte Multilayers: Correlation with Polyelectrolyte Complexes. *Macromolecules* 2012, 45, 3892-3901.
(23) Cho, C.; Jeon, J.-W.; Lutkenhaus, J.; Zacharia, N. S. Electric Field Induced Morphological Transitions in Polyelectrolyte Multilayers. *ACS Appl. Mater. Interfaces* 2013, 5, 4930-4936.
(24) Krylova, I. Painting by electrodeposition on the eve of the 21st century. *Prog. Org. Coat.* 2001, 42, 119-131.
(25) Krogman, K. C.; Lowery, J. L.; Zacharia, N. S.; Rutledge, G. C.; Hammond, P. T. Spraying asymmetry into functional membranes layer-by-layer. *Nat Mater* 2009, 8, 512-518.
(26) Gamier, T.; Dochter, A.; T. Chau, N. T.; Schaaf, P.; Jierry, L.; Boulmedais, F. Surface confined self-assembly of polyampholytes generated from charge-shifting polymers. *Chemical Communications* 2015, 51, 14092-14095.
(27) Dochter, A.; Gamier, T.; Pardieu, E.; Chau, N. T. T.; Maerten, C.; Senger, B.; Schaaf, P.; Jierry, L.; Boulmedais, F. Film Self-Assembly of Oppositely Charged Macromolecules Triggered by Electrochemistry through a Morphogenic Approach. *Langmuir* 2015, 31, 10208-10214.
(28) Rydzek, G.; Ji, Q.; Li, M.; Schaaf, P.; Hill, J. P.; Boulmedais, F.; Ariga, K. Electrochemical nanoarchitectonics and layer-by-layer assembly: From basics to future. *Nano Today* 2015, 10, 138-167.
(29) Richardson, J. J.; Cui, J.; Bjornmalm, M.; Braunger, J. A.; Ejima, H.; Caruso, F. Innovation in Layer-by-Layer Assembly. *Chem. Rev.* 2016.
(30) Ngankam, A. P.; Van Tassel, P. R. In situ layer-by-layer film formation kinetics under an applied voltage measured by optical waveguide lightmode spectroscopy. *Langmuir* 2005, 21, 5865-5871.
(31) Ngankam, A. P.; Van Tassel, P. R. Continuous polyelectrolyte adsorption under an applied electric potential. *Proc. Natl. Acad. Sci. U.S.A.* 2007, 104, 1140-1145.
(32) Ko, Y. H.; Kim, Y. H.; Park, J.; Nam, K. T.; Park, J. H.; Yoo, P. J. Electric-Field-Assisted Layer-by-Layer Assembly of Weakly Charged Polyelectrolyte Multilayers. *Macromolecules* 2011, 44, 2866-2872.

(33) Van Tassel, P. R. Polyelectrolyte adsorption and layer-by-layer assembly: Electrochemical control. *Curr. Opin. Colloid Interface Sci.* 2012, 17, 106-113.

(34) Nilsson, S.; Bjorefors, F.; Robinson, N. D. Electrochemical quartz crystal microbalance study of polyelectrolyte film growth under anodic conditions. *Appl. Surf. Sci.* 2013, 280, 783-790.

(35) Johannsmann, D. Viscoelastic, mechanical, and dielectric measurements on complex samples with the quartz crystal microbalance. *Phys. Chem. Chem. Phys.* 2008, 10, 4516-4534.

(36) Martin, E. J.; Mathew, M. T.; Shull, K. R. Viscoelastic Properties of Electrochemically Deposited Protein/Metal Complexes. *Langmuir* 2015, 31, 4008-4017.

(37) DeNolf, G. C.; Sturdy, L. F.; Shull, K. R. High-Frequency Rheological Characterization of Homogeneous Polymer Films with the Quartz Crystal Microbalance. *Langmuir* 2014, 30, 9731-9740.

(38) Martin, E. J.; Sadman, K.; Shull, K. R. Anodic Electrodeposition of a Cationic Polyelectrolyte in the Presence of Multivalent Anions. *Langmuir* 2016, 32, 7747-7756.

(39) Haynes, W. M. *CRC Handbook of Chemistry and Physics*, 95th Edition; 2014.

(40) Kern, D. M. H. The Polarography and Standard Potential of the Oxygen-Hydrogen Peroxide Couple. *J. Am. Chem. Soc.* 1954, 76, 4208-4214.

(41) Comsol Multiphysics 5.2 Corrosion Module User's Guide. 2015.

(42) Luo, X.-L.; Xu, J.-J.; Du, Y.; Chen, H.-Y. A glucose biosensor based on chitosan-glucose oxidase-gold nanoparticles biocomposite formed by one-step electrodeposition. *Anal. Biochem.* 2004, 334, 284-289.

(43) Cheng, Y.; Gray, K. M.; David, L.; Royaud, I.; Payne, G. F.; Rubloff, G. W. Characterization of the cathodic electrodeposition of semicrystalline chitosan hydrogel. *Materials Letters* 2012, 87, 97-100.

(44) Pang, X.; Zhitomirsky, I. Electrophoretic deposition of composite hydroxyapatitechitosan coatings. *Materials Characterization* 2007, 58, 339-348.

(45) Liu, Y.; Luo, D.; Ata, M. S.; Zhang, T.; Wallar, C. J.; Zhitomirsky, I. Universal dispersing agent for electrophoretic deposition of inorganic materials with improved adsorption, triggered by chelating monomers. *Journal of Colloid and Interface Science* 2016, 462, 1-8.

(46) Stewart, K. L.; Gewirth, A. A. Mechanism of Electrochemical Reduction of Hydrogen Peroxide on Copper in Acidic Sulfate Solutions. *Langmuir* 2007, 23, 9911-9918.

(47) Gerlache, M.; Senturk, Z.; Quarin, G.; Kauffmann, J.-M. Electrochemical behavior of $H_2O_2$ on gold. *Electroanalysis* 1997, 9, 1088-1092.

(48) Chollakup, R.; Smitthipong, W.; Eisenbach, C. D.; Tirrell, M. Phase Behavior and Coacervation of Aqueous Poly(acrylic acid)-Poly(allylamine) Solutions. *Macromolecules* 2010, 43, 2518-2528.

(49) Salomaki, M.; Kankare, J. Modeling the Growth Processes of Polyelectrolyte Multilayers Using a Quartz Crystal Resonator. *J. Phys. Chem. B* 2007, 111, 8509-8519.

(50) Sun, B.; Jewell, C. M.; Fredin, N. J.; Lynn, D. M. Assembly of Multilayered Films Using Well-Defined, End-Labeled Poly(acrylic acid): Influence of Molecular Weight on Exponential Growth in a Synthetic Weak Polyelectrolyte System. *Langmuir* 2007, 23, 8452-8459.

(51) Han, B.; Chery, D. R.; Yin, J.; Lu, X. L.; Lee, D.; Han, L. Nanomechanics of layerby-layer polyelectrolyte complexes: a manifestation of ionic cross-links and fixed charges. *Soft Matter* 2016, 12, 1158-1169.

(52) Jaber, J. A.; Schlenoff, J. B. Mechanical Properties of Reversibly Cross-Linked Ultrathin Polyelectrolyte Complexes. *J. Am. Chem. Soc.* 2006, 128, 2940-2947.

(53) Jaber, J. A.; Schlenoff, J. B. Dynamic Viscoelasticity in Polyelectrolyte Multilayers: Nanodamping. *Chem. Mater.* 2006, 18, 5768-5773.

(54) Notley, S. M.; Biggs, S.; Craig, V. S. J.; Wagberg, L. Adsorbed layer structure of a weak polyelectrolyte studied by colloidal probe microscopy and QCM-D as a function of pH and ionic strength. *Phys. Chem. Chem. Phys.* 2004, 6, 2379-2386.

(55) Notley, S. M.; Eriksson, M.; Wagberg, L. Visco-elastic and adhesive properties of adsorbed polyelectrolyte multilayers determined in situ with QCM-D and AFM measurements. *Journal of Colloid and Interface Science* 2005, 292, 29-37.

(56) Mendelsohn, J. D.; Barrett, C. J.; Chan, V. V.; Pal, A. J.; Mayes, A. M.; Rubner, M. F. Fabrication of Microporous Thin Films from Polyelectrolyte Multilayers. *Langmuir* 2000, 16, 5017-5023.

(57) Liu, Y.; Zhang, B.; Gray, K. M.; Cheng, Y.; Kim, E.; Rubloff, G. W.; Bentley, W. E.; Wang, Q.; Payne, G. F. Electrodeposition of a weak polyelectrolyte hydrogel: remarkable effects of salt on kinetics, structure and properties. *Soft Matter* 2013, 9, 2703-2710.

(58) Vogt, B. D.; Lin, E. K.; Wu, W.-l.; White, C. C. Effect of Film Thickness on the Validity of the Sauerbrey Equation for Hydrated Polyelectrolyte Films. *J. Phys. Chem. B* 2004, 108, 12685-12690.

(59) Petrov, A. I.; Antipov, A. A.; Sukhorukov, G. B. Base-Acid Equilibria in Polyelectrolyte Systems: From Weak Polyelectrolytes to Interpolyelectrolyte Complexes and Multilayered Polyelectrolyte Shells. *Macromolecules* 2003, 36, 10079-10086.

(60) Bromberg, L. Properties of Aqueous Solutions and Gels of Poly(ethylene oxide)-bpoly(propylene oxide)-b-poly (ethylene oxide)-g-poly(acrylic acid). *J. Phys. Chem. B* 1998, 102, 10736-10744.

(61) Philippova, O. E.; Hourdet, D.; Audebert, R.; Khokhlov, A. R. pH-Responsive Gels of Hydrophobically Modified Poly(acrylic acid). *Macromolecules* 1997, 30, 8278-8285.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more".

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated.

What is claimed is:

1. A method for forming a polyelectrolyte complex (PEC) film, the method comprising applying a potential between a working electrode and a counter electrode, the electrodes in contact with an aqueous polyelectrolyte solution having a bulk pH, the aqueous polyelectrolyte solution comprising a pH sensitive PEC pair comprising an unmodified anionic polymer and a cationic species,
an electrochemical pH agent other than water, and
a salt,
wherein the applied potential induces an electrochemical reaction of the electrochemical pH agent to generate $OH^-$ or $H^+$ at the working electrode without inducing water electrolysis in the aqueous polyelectrolyte solution, thereby forming a PEC film from the unmodified anionic polymer and the cationic species on a surface of the working electrode.

2. The method of claim 1, wherein the unmodified anionic polymer and the cationic species are provided as two distinct compounds.

3. The method of claim 1, wherein the unmodified anionic polymer comprises carboxylic acid groups, phosphoric acid groups, or sulfonic acid groups.

4. The method of claim 3, wherein the unmodified anionic polymer comprises carboxylic acid groups.

5. The method of claim 1, wherein the cationic species is an unmodified cationic polymer.

6. The method of claim 5, wherein the unmodified cationic polymer comprises amine groups.

7. The method of claim 1, wherein the unmodified anionic polymer comprises carboxylic acid groups, phosphoric acid groups or sulfonic acid groups, and the cationic species is an unmodified cationic polymer.

8. The method of claim 7, wherein the unmodified cationic polymer comprises amine groups.

9. The method of claim 1, wherein the electrochemical pH agent is not hydroquinone.

10. The method of claim 1, wherein the electrochemical pH agent is hydrogen peroxide.

11. The method of claim 10, wherein the hydrogen peroxide is present at a concentration in a range of from about 1 mM to about 150 mM.

12. The method of claim 1, wherein the aqueous polyelectrolyte solution comprises a dye, a pigment, or both.

13. The method of claim 1, wherein the surface of the working electrode is non-planar.

14. The method of claim 1, wherein the PEC film is characterized by a thickness of at least about 1 μm after about 5 minutes.

15. The method of claim 14, wherein the thickness is at least about 5 μm.

16. A method for forming a polyelectrolyte complex (PEC) film, the method comprising applying a potential between a working electrode and a counter electrode, the electrodes in contact with an aqueous polyelectrolyte solution having a bulk pH, the aqueous polyelectrolyte solution comprising
a pH sensitive PEC pair comprising an unmodified anionic polymer and an unmodified cationic polymer, the unmodified anionic polymer and the unmodified cationic polymer being two distinct compounds,
an electrochemical pH agent other than water or hydroquinone, and
a salt,
wherein the applied potential induces an electrochemical reaction of the electrochemical pH agent to generate $OH^-$ or $H^+$ at the working electrode without inducing water electrolysis in the aqueous polyelectrolyte solution, thereby forming a PEC film from the unmodified anionic polymer and the cationic species on a surface of the working electrode.

17. The method of claim 16, wherein the unmodified anionic polymer comprises carboxylic acid groups, phosphoric acid groups, or sulfonic acid groups.

18. The method of claim 17, wherein the unmodified cationic polymer comprises amine groups.

19. The method of claim 16, wherein the electrochemical pH agent is hydrogen peroxide.

20. The method of claim 18, wherein the electrochemical pH agent is hydrogen peroxide.

* * * * *